(12) United States Patent
Yang

(10) Patent No.: US 8,650,379 B2
(45) Date of Patent: Feb. 11, 2014

(54) DATA PROCESSING METHOD FOR NONVOLATILE MEMORY SYSTEM

(75) Inventor: Jung Woong Yang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 243 days.

(21) Appl. No.: 13/313,825

(22) Filed: Dec. 7, 2011

(65) Prior Publication Data

US 2012/0151125 A1  Jun. 14, 2012

(30) Foreign Application Priority Data

Dec. 8, 2010  (KR) ......................... 10-2010-0124977

(51) Int. Cl.
*G06F 12/00* (2006.01)
*G11C 11/34* (2006.01)

(52) U.S. Cl.
USPC ....... 711/202; 711/103; 711/162; 365/185.33

(58) Field of Classification Search
USPC ...................... 711/103, 162, 202; 365/185.33
See application file for complete search history.

(56) References Cited

U.S. PATENT DOCUMENTS

| | | | |
|---|---|---|---|
| 2010/0125702 A1 | 5/2010 | Lee et al. | |
| 2011/0035537 A1* | 2/2011 | Kwon | ........................... 711/103 |
| 2011/0035575 A1* | 2/2011 | Kwon | ............................... 713/2 |
| 2011/0047320 A1* | 2/2011 | Kwon | ........................... 711/103 |

FOREIGN PATENT DOCUMENTS

| | | |
|---|---|---|
| KR | 1020060090088 A | 8/2006 |
| KR | 1020100056750 A | 5/2010 |

* cited by examiner

*Primary Examiner* — Reginald Bragdon
*Assistant Examiner* — Mehdi Namazi
(74) *Attorney, Agent, or Firm* — Volentine & Whitt, PLLC

(57) ABSTRACT

A data processing method for a nonvolatile memory system is described. In the method, a host CPU calls N data file segments, generates logical addresses, and then transfers the N data file segments and logical addresses to an ASIC. The ASIC then maps the logical addresses onto physical addresses of a nonvolatile memory, derives N payload data segments, and collectively generates corresponding metadata for all of the N payload data segments. Then, a single multi-segment transfer operation is performed to sequentially write the N payload data segments to a data block in the nonvolatile memory, and thereafter, write the corresponding metadata to a metadata block associated with the data block.

16 Claims, 8 Drawing Sheets

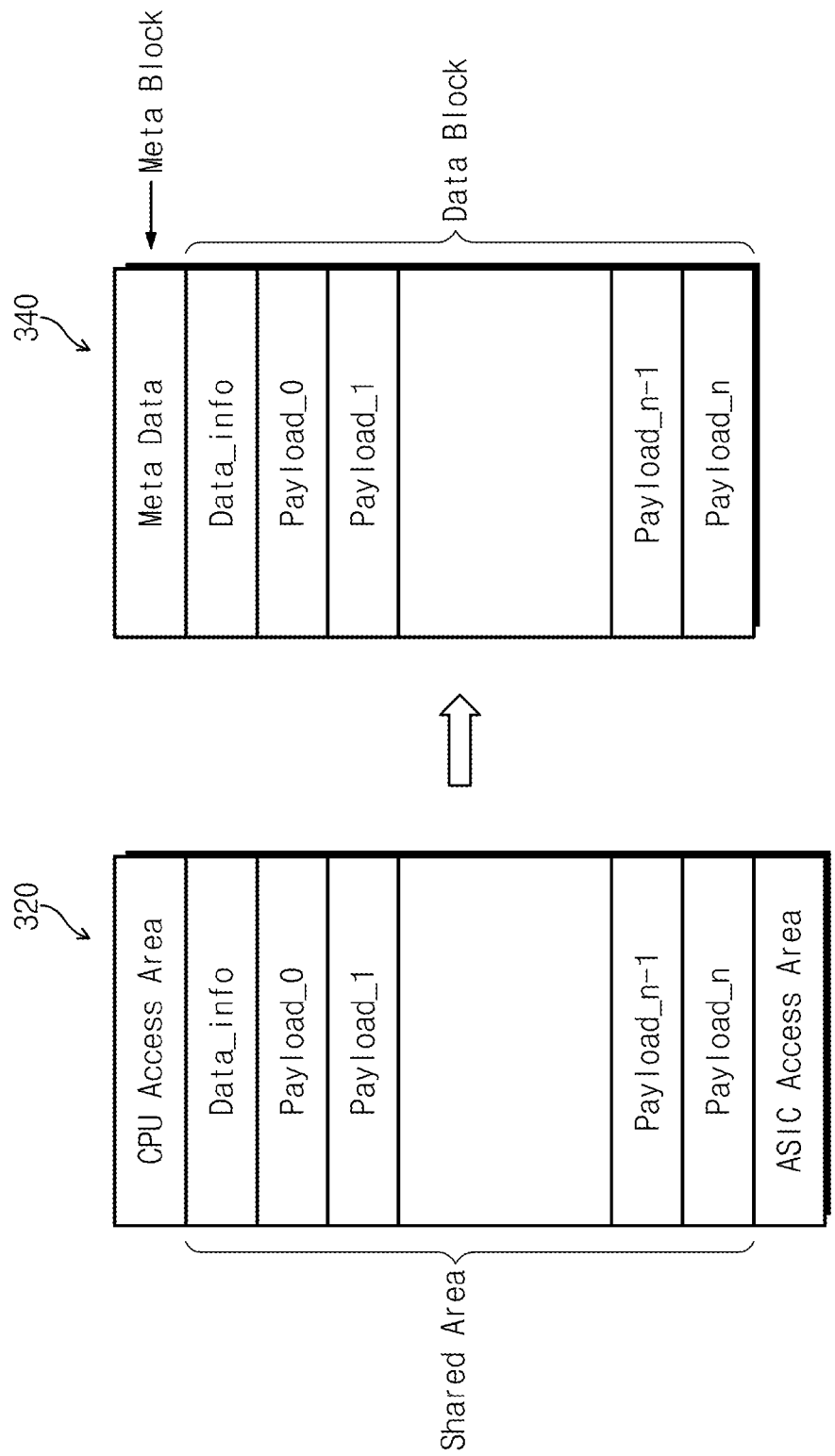

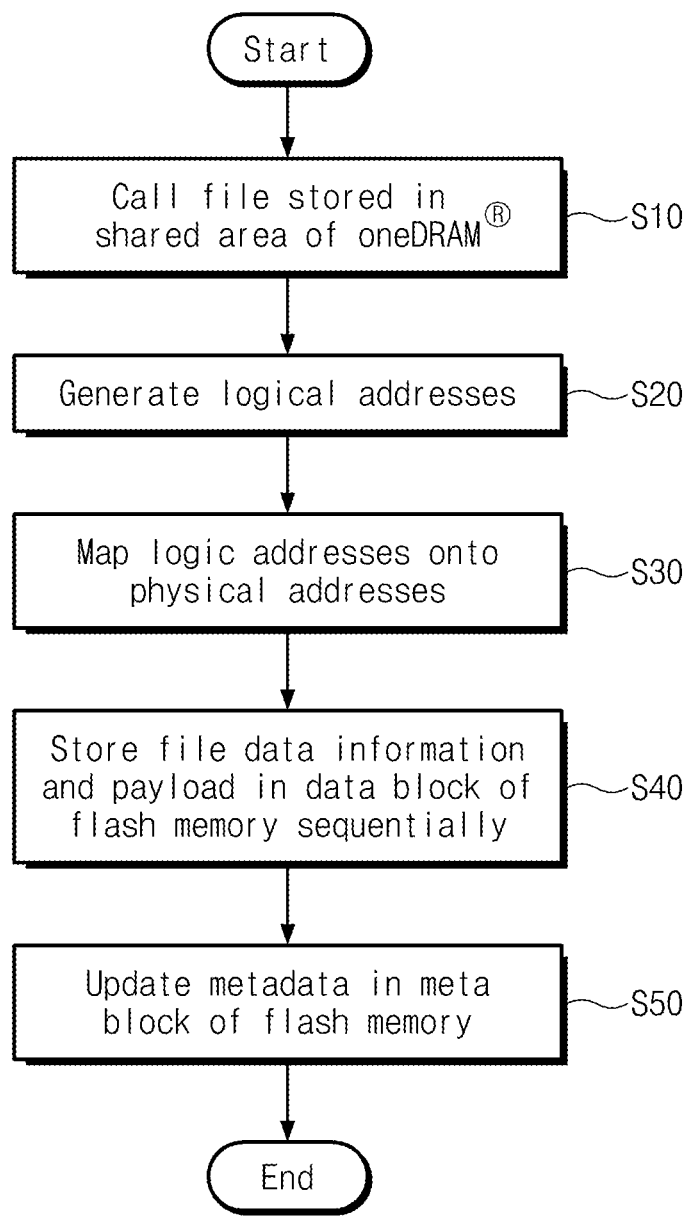

DATA PROCESSING METHOD FOR NONVOLATILE MEMORY SYSTEM

CROSS-REFERENCE TO RELATED APPLICATIONS

This application claims under 35 U.S.C §119 the benefits of Korean Patent Application No. 10-2010-0124977 filed Dec. 8, 2010, the subject matter of which is hereby incorporated by reference.

BACKGROUND OF THE INVENTION

Embodiments of the inventive concept relate to data processing methods for nonvolatile memory systems. More particularly, embodiments of the inventive concept relate to data processing methods for nonvolatile memory systems that are capable of maximizing the performance of constituent firmware by simultaneously updating metadata after a file data transfer between a host Central Processing Unit (CPU) and a memory.

Semiconductor memory devices may be classified as volatile memories such as DRAM, SRAM, etc., and nonvolatile such as EEPROM, FRAM, PRAM, flash memory, etc. Volatile memory loses stored data in the absence of applied power, while nonvolatile memory is able to retain stored data even in the absence of applied power. One or more memory device(s) are typically accessed in a memory system by a controller or interface.

Recent consumer trends are towards devices, and mobile devices in particular, that incorporate nonvolatile memory systems and devices. For example, nonvolatile memory systems and devices are commonly used in MP3 players, digital cameras, mobile phones, camcorders, flash cards, solid state disks, etc.

In particular, so-called flash memory, being one type of nonvolatile memory, has been widely adapted for use as a storage medium in digital data systems due to its combination of high programming speed, low power consumption, a mass storage capacity, etc.

FIG. 1 is a block diagram illustrating a flash memory system as one example of a conventional nonvolatile memory system.

Referring to FIG. 1, a nonvolatile memory system 100 comprises a flash memory device 140 and an application specific integrated circuit (ASIC) 130 serving as an interface to the flash memory device 140. In the example of FIG. 1, the nonvolatile memory system 100 is shown connected via a host interface with a host CPU 110 and a DRAM 120. The host CPU 110 typically provides commands (e.g., read, write and erase commands, etc.) to the flash memory 140 via the ASIC 130 and the host interface. In this context, a "command" may be variously communicated as one or more control signals and/or one or more data packets.

The ASIC 130 may be a memory controller. For example, when receiving a write command from the host CPU 110, the ASIC 130 may be used to control the flash memory 140 such that file data received from the host CPU 110 is written to the flash memory 140 via a flash interface.

FIG. 2A is a block diagram further describing one possible relationship between a file system 115 run on the host CPU 110 and a flash translation layer (FTL) 135 run by the ASIC 130. As is conventionally understood, the file system 115 is generally capable of managing files and associated file data resulting from the execution of one or more applications on the host CPU. As is also conventionally understood, the FTL 135 is used to manage memory space in the flash memory 140 by, among other functions, translating (or "mapping") logical addresses used by the file system 115 and/or host CPU 110 into physical addresses used to store data in the flash memory 140.

Thus, in response to various commands issued by the host CPU 110, the file system 115 manages the use of the flash memory 140 through the functionality provided by the host interface, the FTL 135 and the flash interface, wherein the ASIC 130 is integral to the operation of the host interface and flash interface.

FIG. 2B is a conceptual diagram describing one possible organization of file data during a program (or write) operation performed by the flash memory system 100. Referring to FIGS. 1, 2A and 2B, file data (e.g., data segments D0 through D7) during a program operation may include certain metadata updates. That is, "input data" (or payload data) of the sort communicated to the flash memory 140 during a program operation may include a plurality of data segments (D0 through D7) and one or more related metadata update instructions. The term "segment" is used here to generically identify input data of any reasonable size and/or particular composition.

According to the example of FIG. 2B, the file system 115 generates logical addresses for each input data segments D0 to D7 in response to a write request provided by the host CPU 110. Upon receiving the input data segments, the FTL maps the corresponding logical addresses generated by the file system 115 onto physical addresses for the flash memory 140.

Thus, the FTL 135 may program the first data segment D0 in the flash memory 140 and update certain metadata related to the first data segment. This approach is used for each one of the plurality of input data segments D0 through D7. Accordingly, the eight (8) input data segments (D0 through D7) provided by the file system 115 in the example of FIG. 2B result in eight (8) corresponding metadata update instructions being sent to the flash memory 140 and eight (8) corresponding execution periods, one for each metadata update.

However, as nonvolatile memory systems are increasingly used to store large volumes of user data, particularly in mobile devices such as cellular phones, the effective number of input data segments being programmed to memory has dramatically increased. The resulting large number of metadata updates slows memory system performance and firmware operation in particular.

SUMMARY OF THE INVENTION

Embodiments of the inventive concept provide data processing methods for nonvolatile memory systems that allow firmware to be efficiently utilized even when faced with numerous metadata update requirements caused by input data transfers from a host CPU.

In one embodiment, the inventive concept provides a data processing method for a nonvolatile memory system including a host CPU connected to a memory link architecture (MLA) including a multiple access memory, an Application Specific Integrated Circuit (ASIC), and a nonvolatile memory, the data processing method comprising; by operation of the host CPU, calling N data file segments indicated by a write request, and generating logical addresses for the N data file segments, transferring the N data file segments and logical addresses to the ASIC, using the ASIC, mapping the logical addresses onto physical addresses of the nonvolatile memory, using the ASIC, deriving N payload data segments using the N file data segments and logical addresses, and collectively generating corresponding metadata for all of the N payload data segments; and then, performing a single multi-segment transfer operation that includes, sequentially writing the N payload data segments to a data block in the nonvolatile memory, and thereafter, writing the corresponding metadata to a metadata block associated with the data block.

BRIEF DESCRIPTION OF THE DRAWINGS

The above and other objects and features associated with embodiments of the inventive concept will become apparent from the following description with reference to the following figures.

FIG. 4B is a conceptual diagram illustrating an addressing approach for a oneDRAM® and a flash memory.

FIG. 5 is a flowchart summarizing a program operation for file data being sent to a flash memory for storage and including a metadata update instruction.

DETAILED DESCRIPTION

Figure 1:
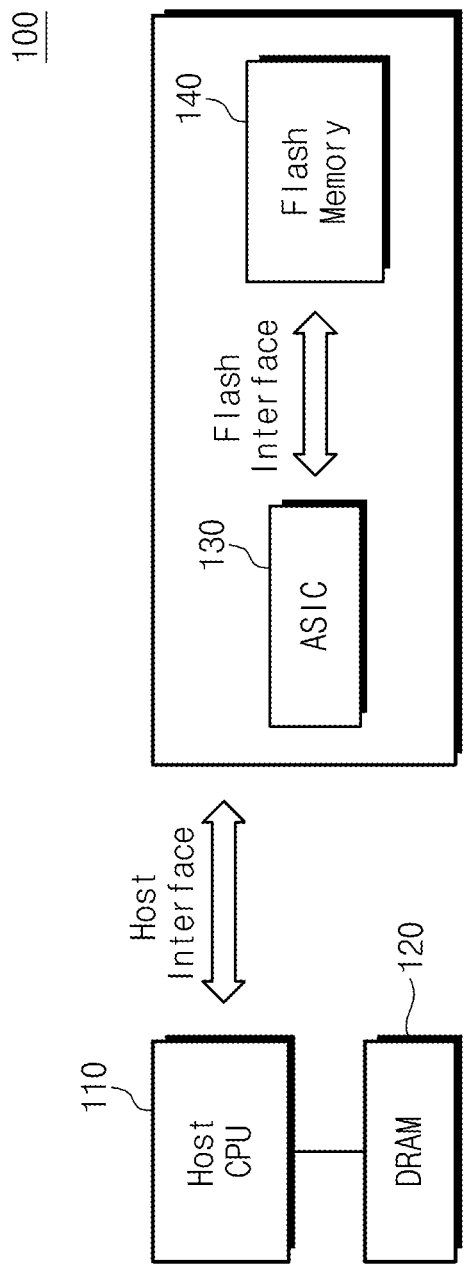
FIG. 1 is a block diagram illustrating a conventional nonvolatile memory system (i.e., a flash memory) connected to a host CPU.
Figure 2A:
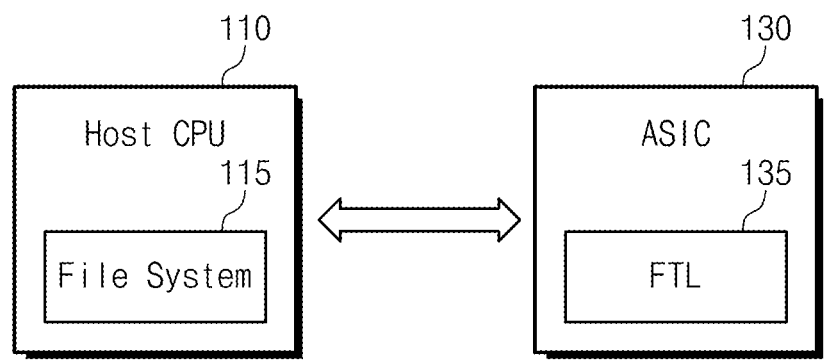
FIG. 2A is a diagram further illustrating a relationship between a conventional file system and a flash translation layer.
Figure 2B:
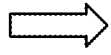
FIG. 2B is a conceptual diagram describing one possible input data (e.g., file data) during a program operation directed to the flash memory of FIGS. 1 and 2A.

Certain embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like numbers and labels are used to denote like or similar elements.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 3:
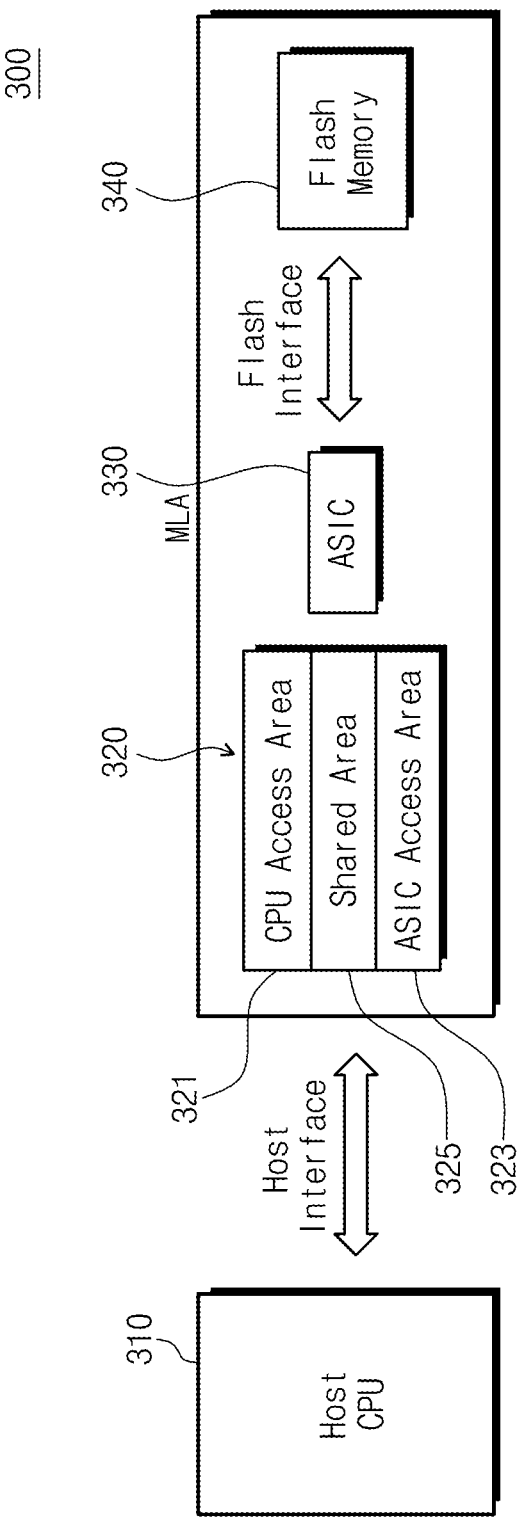
FIG. 3 is a block diagram illustrating a nonvolatile memory system including a flash memory according to an embodiment of the inventive concept.

FIG. 3 is a block diagram illustrating a nonvolatile memory system including a flash memory according to an embodiment of the inventive concept.

Referring to FIG. 3, a nonvolatile memory system 300 comprises a host CPU 310 connected to a "memory link architecture (MLA)" including in the illustrated example, a oneDRAM® 320, an ASIC 330, and a flash memory 340. The constituent elements 320, 330, and 340 forming the memory link architecture may be commonly integrated into a single integrated circuit (IC) or in a single semiconductor chip.

As has been noted above, the host CPU 310 may provide variously defined commands directed to the flash memory 340. However, these command are communicated by and executed using the resources provided by memory link architecture in additional to the host interface.

As will be appreciated by those skilled in the art, the oneDRAM® 320 is a particular type of fusion memory including a fast, nonvolatile memory (e.g., a DRAM) capable of enabling multiple access paths (e.g., by a CPU via one port and by an ASIC of a memory system via another port) to at least one shared memory area and at least one dedicated memory area. Hereafter, this type of memory—as best exemplified by the oneDRAM®—will be referred to as a "multiple access memory". As illustrated in FIG. 3, the multiple access memory (e.g., oneDRAM 320) in divided into a CPU access area 321, an ASIC access area 323, and a shared area 325.

The CPU access area 321 is a memory area that may be accessed by only the host CPU 310. The ASIC access area 322 is a memory area that may be accessed by only the ASIC 330. The shared area 325 is a memory area that may be accessed by either the host CPU 310 or the ASIC 330 at any given time.

In certain embodiments of the inventive concept, data may be routed between multiple processors within a mobile device via a single chip incorporating a multiple access memory such as the oneDRAM® instead of a typical DRAM. Provision of a MLA with a multiple access memory allows the removal of two data buffers from the related data paths, thereby improving data processing speed between (e.g.,) a communication processor and a media processor.

The ASIC 330 may be a typical flash memory controller in the embodiment of FIG. 3. For example, when receiving a program command from the host CPU 310, the ASIC 330 may be used control the flash memory 340 to receive and store file data provided to the MLA via a host interface, and subsequently provide to the flash memory 340 via a flash interface.

The flash memory 340 may be formed by one or more NAND flash memory and/or by one or more NOR flash memory. Unlike the NOR flash memory, the NAND flash memory does not support byte-unit read and program operations. That is, the NAND flash memory performs read and program operations on a page unit basis, while performing erase operations on a block unit basis.

Figure 4A:
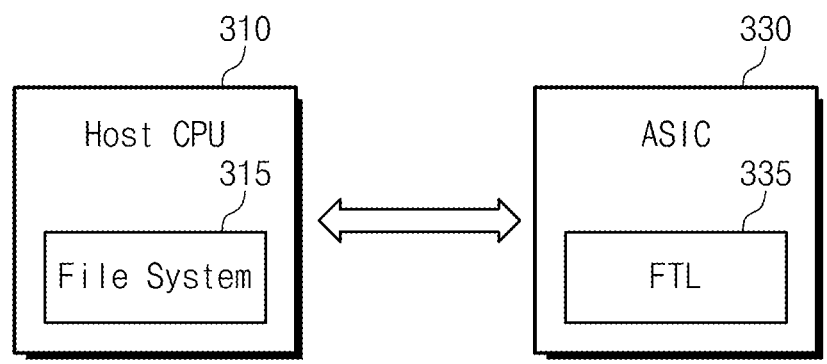
FIG. 4A is a block diagram further illustrating a relationship between a file system and a flash translation layer within the context of certain embodiments of the inventive concept.

FIG. 4A is a conceptual diagram describing one possible relationship between a file system 315 run by the host CPU 340 and a flash translation layer (FTL) 335 run by the ASIC 330 according to certain embodiments of the inventive concept.

As before, the file system 315 may be used to manage data storage and retrieval by the flash memory 340 in response to commands provided by the host CPU 310.

The file system 315 may be provided as part of an operating system OS of the host CPU 310. For example, assuming a Windows® operating system, the file system 315 may include a file allocation table (FAT) type file system and/or a new technology file system (NTFS) type file system. Assuming a Unix®/Linux® operating system, the file system may include an Unix® file system (UFS), an Extended 2 (EXT2), an Extended 3 (EXT3), a journaling file system (JFS), etc.

When payload data is programmed (or written) to the flash memory 340, the flash translation layer 335 maps logical address(es) generated by the file system 315 into corresponding physical address(es) for the flash memory 340. This approach, among other benefits, enables the host CPU 310 to recognize (or functionally "see") the flash memory 340 as a hard disk drive (HDD), or other similar type (SRAM) legacy memory system. Accordingly, the host CPU 310 may access the flash memory 340 in the same manner as it does a HDD.

FIG. 4B is a conceptual diagram illustrating an addressing scheme used in conjunction with a multiple access memory, like the oneDRAM® and a flash memory when file data is programmed to the flash memory.

Referring to FIG. 4B, file data information (Data-info) and a plurality of payload data segments (Payload_0 through Payload_n) are assumed to be stored in the shared area 325 of the oneDRAM® 320 in FIG. 3. The file data information (Data-info) includes information such as command type, corresponding address(es), data size, etc.

Payload data segments (Payload_0 through Payload_n) enable user data to be managed continuously, sequentially, and flexibly. Assuming that each of the payload data segments (Payload_0 through Payload_n) is 4 KB in size, an operation may be performed that transfers data having a total of 4*(n+1) KB in size to the flash memory. This operation will hereafter be referred to as a "multi-segment transfer operation", and those skilled in the art will recognize that such an operation may be variously performed.

Upon receiving a "write request" (e.g., a command indicating a program operation for a flash memory) indicating file data segments D0 through Dn from the host CPU 310, the file system 315 analyzes each file data segment to generate corresponding logical addresses and then generates the file data information (Data-info) and the payload data segments (Payload_0 through Payload_n).

The FTL 335 is then able to map the logical addresses generated and provided by the file system 315 onto corresponding physical addresses for the flash memory 340. The resulting physical addresses are then used during the program operation to store the file data D0 through Dn.

For example, the physical addresses for the flash memory 340 may indicate a particular data block. This data block may be used to store the file data information (Data-info) and each of the payload data segments (Payload_0 through Payload_n). In contrast, corresponding metadata will be stored in a meta block.

As will be understood by those skilled in the art, metadata is a particular kind of data associated with other types of data (e.g., payload data) that is stored in memory. It may be understood generally as data describing stored data, the data storage environment, and/or data structures used to store the data. For example, metadata may include data needed to parse the status of a flash memory or manage the flash memory effectively. Such data may include address mapping table(s) including a logical block address LBA and physical block address PBA, an erase count for a memory block, free block information, bad block information, etc.

Figure 4C:
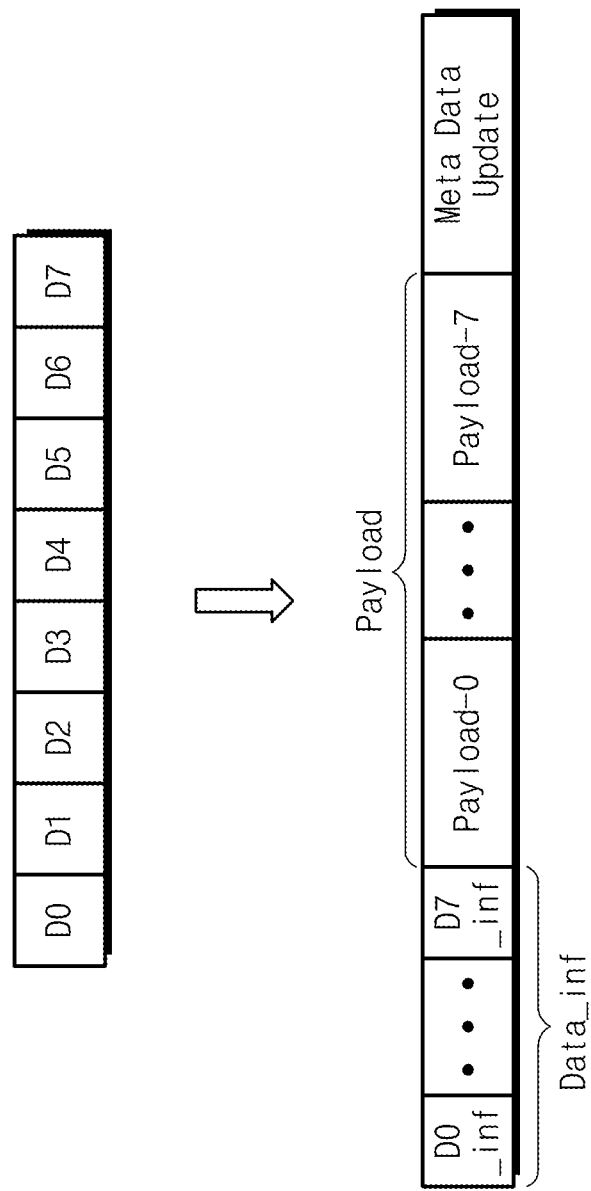
FIG. 4C is a conceptual diagram illustrating one possible organization for file data being communicated during a program operation directed to a flash memory and including a metadata update instruction.

FIG. 4C is a conceptual diagram illustrating one possible organization for file data to be written to a flash memory during a program operation and including one or more metadata update instructions. FIG. 5 is a flowchart summarizing a file data program operation for a flash memory including a metadata update operation.

The file data is assumed to include eight (8) data segments D0 through D7 to be written to the flash memory 340 of FIG. 3.

Referring collectively to FIGS. 3, 4A, 4B, 4C, and 5, the host CPU 310 "calls" file data D0 through D7 in relation to a write request made in response to (e.g.,) an application being executed by the host CPU 310 or a user input. The file data D0 through D7 is assumed to be previously stored in the shared area 325 of the oneDRAM® 320 (S10).

In response to the resulting write request by the host CPU 310, the file system 315 analyzes each file data segment to generate logical addresses and generate corresponding file data information (Data-info) as well as the payload data segments (Payload_0 through Payload_7) (S20).

The FTL 335 then maps the logical addresses generated by the file system 315 onto physical addresses of the flash memory 340 (S30).

The FTL 335 then sequentially stores the file data information (Data-info) and the payload data segments (Payload_0 through Payload_7) in a data block of the flash memory 340 (S40).

In one possible embodiment of the inventive concept, it is assumed that a total of 32 KB of payload data is transferred during a single multi-segment transfer operation wherein each one of eight (8) payload data segments (Payload_0 to Payload_7) is 4 KB in size. However, the inventive concept is not limited thereto. Indeed, data segments having a size of 8 KB, 12 KB, etc., may be used.

Following the multi-segment transfer operation, which may follow transfer of corresponding file data information (Data-info), the FTL 335 updates metadata associated all data segments in the multi-segment transfer operation (S50). For example, the metadata update may be a one-time event (i.e., including only one metadata update instruction) for all of the meta block associated with all of the data segments being programmed to the flash memory 340 during a particular program operation. Alternately, where a write request indicates "N" payload data segments (e.g., file data segments D0 through D7) for a single program operation directed to the flash memory 340, only "M" metadata update instructions are included in the resulting program operation, where M is less than N.

This approach dramatically reduces the number and frequency of metadata updates, thereby improving the execution efficiency of related software and firmware controlling a program operation in a flash memory system. Using the foregoing approach, eight (8) separate metadata updates, each being indicated (e.g.) by a separate metadata update instruction, have been replace by a single metadata update (or less than 8) in the examples described above.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A data processing method for a nonvolatile memory system including a host central processing unit (CPU) and a memory link architecture (MLA) including a multiple access memory, an Application Specific Integrated Circuit (ASIC), and a nonvolatile memory, the data processing method comprising:
by operation of the host CPU, calling N data file segments indicated by a write request, and generating N payload data segments and logical addresses for the N payload data segments based on data file segments;
transferring the N payload data segments and the logical addresses to the ASIC;
using the ASIC, mapping the logical addresses onto physical addresses of the nonvolatile memory;
using the ASIC, collectively generating corresponding metadata for all of the N payload data segments; and then,
performing a single multi-segment transfer operation that includes;
sequentially writing the N payload data segments to a data block in the nonvolatile memory, and thereafter, writing the corresponding metadata to a metadata block associated with the data block.

2. The method of claim 1, wherein a file system running on the host CPU performs the calling of the N data file segments and the generation of N payload data segment and the logical addresses.

3. The method of claim 2, further comprising:
using the file system to analyze the N data file segments and derive file data information for the N data file segments; and
transferring the file data information to the ASIC with the N payload data segments and the logical addresses.

4. The method of claim 3, wherein the single multi-segment transfer operation further comprises; writing the file data information to the data block.

5. The method of claim 4, wherein during the single multi-segment transfer operation the file data information is written to the data block before the N payload data segments are written to the data block.

6. The method of claim 5, wherein during the single multi-segment transfer the N payload data segments are written to the data block before the corresponding metadata is written to the metadata block.

7. The method of claim 2, wherein the file system uses at least one of a File Allocation Table (FAT), a New Technology File System (NTFS), a Unix File System (UFS), an Extended 2 (EXT2), an Extended 3 (EXT3), and a Journaling File System (JFS).

8. The method of claim 1, wherein each of the N payload data segments is 4 KB in size.

9. The method of claim 1, wherein the corresponding metadata includes file location information on N payload data segments, as stored in the nonvolatile memory.

10. The method of claim 1, wherein the nonvolatile memory is a flash memory, and the ASIC runs a flash translation layer (FTL) that performs the mapping of the logical addresses onto the physical addresses.

11. The method of claim 1, wherein the single multi-segment transfer operation consists of a single metadata update instruction that causes the corresponding metadata to be written to the metadata block.

12. The method of claim 1, further comprising:
storing the N file data segments in the multiple access memory in a shared memory area, such that calling the N data file segments transfers the N data file segments from the shared memory area of the multiple access memory to the file system.

13. The method of claim 1, wherein the multiple access memory includes a CPU access area configured to be accessed only by the host CPU, an ASIC access area configured to be accessed only by the ASIC, and the shared area configured to be accessed by either the host CPU or the ASIC at any given time.

14. The method of claim 1, wherein the corresponding metadata is written to the metadata block immediately after the N payload data segments are sequentially written to the data block.

15. A data processing method for a memory link architecture (MLA) including a multiple access memory, an Application Specific Integrated Circuit (ASIC), and a nonvolatile memory, wherein the MLA is connected to a host central processing unit (CPU), comprising:
by using a file system of the host CPU, generating file data information, N payload data segments and logical addresses for the N payload data segments based on N data file segments stored in the multiple access memory, in response to a write command from the host CPU;
transferring the file data information, the N payload data segments and the logical addresses to the ASIC;
by using the ASIC, mapping the logical addresses onto physical addresses of the nonvolatile memory;
by using the ASIC, collectively generating corresponding metadata for all of the N payload data segments; and then,
performing a single multi-segment transfer operation that includes;
writing the file data information to a data block in the nonvolatile memory;
sequentially writing the N payload data segments to the data block, and thereafter,
writing the corresponding metadata to a metadata block associated with the data block.

16. The method of claim 15, wherein the N file data segments stored in the multiple access memory in a shared memory area, such that the N data file segments are transferred from the shared memory area of the multiple access memory to the file system.

* * * * *